United States Patent
Gerdes et al.

(10) Patent No.: US 8,975,855 B2
(45) Date of Patent: Mar. 10, 2015

(54) COMPENSATING HYSTERESIS BANDS TO HOLD SPECIFIED SWITCHING FREQUENCY

(75) Inventors: Jesse Gerdes, Dunlap, IL (US); Jackson Wai, Dunlap, IL (US); Ahmed Khalil, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 241 days.

(21) Appl. No.: 13/555,530

(22) Filed: Jul. 23, 2012

(65) Prior Publication Data
US 2014/0021889 A1    Jan. 23, 2014

(51) Int. Cl.
*H02P 1/46* (2006.01)

(52) U.S. Cl.
USPC ........................... 318/701; 318/254.1

(58) Field of Classification Search
USPC ................. 318/701, 254, 138, 254.1
See application file for complete search history.

(56) References Cited

U.S. PATENT DOCUMENTS

| | | | |
|---|---|---|---|
| 4,558,264 A * | 12/1985 | Weischedel | 318/400.03 |
| 4,904,919 A * | 2/1990 | McNaughton | 318/798 |
| 4,933,621 A | 6/1990 | MacMinn et al. | |
| 5,166,591 A | 11/1992 | Stephens et al. | |
| 5,530,333 A | 6/1996 | Turner | |
| 5,579,216 A | 11/1996 | Meyer et al. | |
| 5,998,945 A * | 12/1999 | Elliott | 318/254.1 |
| 6,198,239 B1 | 3/2001 | Blackburn | |
| 6,392,379 B2 | 5/2002 | Heese | |
| 2002/0063547 A1 | 5/2002 | Turner et al. | |
| 2002/0185990 A1 | 12/2002 | Elliott et al. | |
| 2003/0107342 A1 | 6/2003 | Gallegos-Lopez | |
| 2007/0194627 A1 * | 8/2007 | Mori et al. | 307/103 |
| 2009/0021192 A1 | 1/2009 | Kudligi | |
| 2011/0221408 A1 * | 9/2011 | Martin et al. | 323/272 |
| 2011/0241584 A1 | 10/2011 | He et al. | |
| 2012/0161725 A1 | 6/2012 | Hartman et al. | |

OTHER PUBLICATIONS

Kang, Jun-Koo, "Direct torque control of induction machine with variable amplitude control of flux and torque hysteresis bands", Electric Machines & Drives, May 1999, pp. 640-642, International Conference IEMD.

Okumus, H.I., "Direct Torque Control of Induction Machine Drives Using Adaptive Hysteresis Band for Constant Switching Frequency", Electric Machines & Drives Conference, May 2007, pp. 1762-1767, vol. 2, IEEE International.

* cited by examiner

*Primary Examiner* — Rina Duda
*Assistant Examiner* — Bickey Dhakal
(74) *Attorney, Agent, or Firm* — Miller, Matthias & Hull LLP

(57) ABSTRACT

A control system for compensating a hysteresis band of a switched reluctance (SR) machine having a rotor and a stator is provided. The control system may include a converter circuit and a controller. The converter circuit may be operatively coupled to the stator and include a plurality of switches in selective communication with each phase of the stator. The controller may be in communication with each of the stator and the converter circuit, and configured to monitor at least one phase current of the SR machine relative to a current threshold of the hysteresis band, determine an adjustment value based on a difference between the phase current and the current threshold if the phase current exceeds the current threshold, and compensate the current threshold by the adjustment value.

20 Claims, 6 Drawing Sheets

COMPENSATING HYSTERESIS BANDS TO HOLD SPECIFIED SWITCHING FREQUENCY

TECHNICAL FIELD

The present disclosure relates generally to hysteresis-based controls, and more particularly, to systems and methods of compensating hysteresis-based current control in switched reluctance (SR) machines.

BACKGROUND

With the growing interest in energy conservation, increasingly more machines, such as mobile industrial work machines or stationary power generation machines, are supplied with electric drive assemblies or systems for operating various tools or functions of the machine. Ongoing developments in electric drives have made it possible for electrically driven machines to effectively match or surpass the performance of mechanically driven machines while requiring significantly less fuel and overall energy. As electric drives become increasingly more commonplace with respect to such machines, the demand for more efficient generators and techniques for controlling same has also increased.

Among the various types of electrically driven machines available for use with such electric drives, switched reluctance (SR) machines have received great interest for being robust, cost-effective, and overall, more efficient. An SR machine is typically used to convert mechanical power received from a primary power source, such as a combustion engine, into electrical power for performing one or more operations of the machine. Additionally, an SR machine may be used to convert electrical power stored within a common bus or storage device into mechanical power. SR machines can similarly be used in conjunction with other generic power sources, such as batteries, fuel cells, and the like. Still further, SR machines can also be used with stationary machines having conventional power sources such as windmills, hydroelectric dams, or any other generic power source commonly used for stationary applications.

A typical SR machine essentially includes a multi-phase stator that is electrically coupled to an electric drive circuit, and a rotor that is rotatably positioned within the stator. In a motoring mode of operation, the electric drive selectively enables gates or switches associated with each phase of the stator so as to cause electromagnetic interactions between the stator and rotor poles and rotate the rotor relative to the stator at a desired torque and/or speed. Alternatively, in a generating mode of operation, the electric drive may be configured to receive any electrical power which may be induced by mechanical rotations of the rotor relative to the stator. The electric drive may use the electrical power that is induced during the generating mode to power auxiliary or accessory devices of the associated work machine, or in some cases, store the electrical power in an energy storage device.

Conventional schemes for controlling SR machines may involve operating two switches associated with each phase of the stator, or current chopping, in one of a number of different operating modes. For instance, control for operating modes corresponding to a first range of speed tasks may be conducted by hard chopping current to the two switches of each phase, while control for a second range of speed tasks may be conducted by soft chopping current to the two switches of each phase. A conventional hard chopping routine sources a pulsed phase current by simultaneously opening and closing both switches of each phase at the required switching frequency, whereas a conventional soft chopping routine sources soft pulsed phase current by holding one of the switches closed while opening and closing the other switch at the switching frequency.

Although functional, conventional SR machines offer significant room for improvements in terms performance and efficiency. One commonly shared area of interest relates to improving the accuracy of torque production, or maintaining the average torque output of a machine, such as an SR machine, at a more consistent level. The average torque output may be better managed by improving the switching strategy or chopping control scheme being applied per phase of the SR machine. However, adjustments in the chopping scheme are limited due to various hardware constraints. Among other things, the switching frequency as well as the turn-off point for each phase cannot be adjusted without adversely affecting machine components, thus leaving only the turn-on point of each phase as a point of adjustment.

The turn-on and turn-off points of each phase may be managed by the respective bounds or limits of a predefined hysteresis band. These limits of the hysteresis band may further be preconfigured according to any one of a number of different techniques. For example, some techniques establish a generally wider hysteresis band to accommodate for a wider range of phase current fluctuations, while some other techniques adjust hysteresis bands based on rotor position by affecting machine inductance. However, use of such techniques often results in higher currents, which further leads to increased losses in power, higher operational temperatures and increased risks of over-current conditions.

In order to help prevent such increases in current, other techniques have also been used which engage only the turn-on point, or the lower limit of the hysteresis band, to be adjusted and lowered. However, due to machine inductance, current rise rates, and in some instances, current fall rates, the lower limit of the hysteresis band can exhibit a drooping effect. A drooping effect may be caused by decreases in machine inductance, which cause the current to rise at faster rates. Moreover, as the current rises at faster rates, more time is required to allow the current to sufficiently fall in order to satisfy the switching frequency of the machine. In response, the average observed phase current gradually decreases, or droops, and increasingly departs from the initially desired or target phase current. Such decreases in the average phase current further lead to lower average torque production and an overall reduction in torque accuracy.

Accordingly, there is a general need for improved hysteresis-based controls which perform with more consistency and accuracy while satisfying various hardware constraints. In one particular instance, there is a need for an improved hysteresis-based control for use with current chopping in SR machines which overcomes the deficiencies identified above. Specifically, there is a need to improve the accuracy of the torque produced by an SR machine, and more consistently maintain a desired average torque output thereof. Moreover, there is a need to better maintain the average phase current of the machine at a consistent level while staying within the limits of the machine's switching frequency without introducing high magnitudes of current.

SUMMARY OF THE DISCLOSURE

In one aspect of the present disclosure, a control system for compensating a hysteresis band of a switched reluctance (SR) machine having a rotor and a stator is provided. The control system may include a converter circuit and a controller. The converter circuit may be operatively coupled to the stator and include a plurality of switches in selective communication with each phase of the stator. The controller may be in communication with each of the stator and the converter circuit, and configured to monitor at least one phase current of the SR machine relative to a current threshold of the hysteresis band, determine an adjustment value based on a difference between the phase current and the current threshold if the phase current exceeds the current threshold, and compensate the current threshold by the adjustment value.

In another aspect of the present disclosure, a method of controlling hysteresis compensation is provided. The method may include the steps of monitoring at least one parameter relative to a hysteresis band extending between an upper threshold and a lower threshold; determining an adjustment value based on a difference between the at least one parameter and any exceeded one of the upper and lower thresholds; and adjusting each of the upper and lower thresholds of the hysteresis band by the adjustment value.

In yet another aspect of the present disclosure, a method of providing hysteresis compensation for an SR machine having a rotor and a stator is provided. The method may include the steps of monitoring a phase current through at least one phase of the stator relative to each of an upper current threshold and a lower current threshold of the hysteresis band; determining a difference value between the phase current and any one of the upper and lower current thresholds exceeded by the phase current; determining an adjustment value based at least partially on the difference value; and adjusting each of the upper and lower current thresholds of the hysteresis band by the adjustment value.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
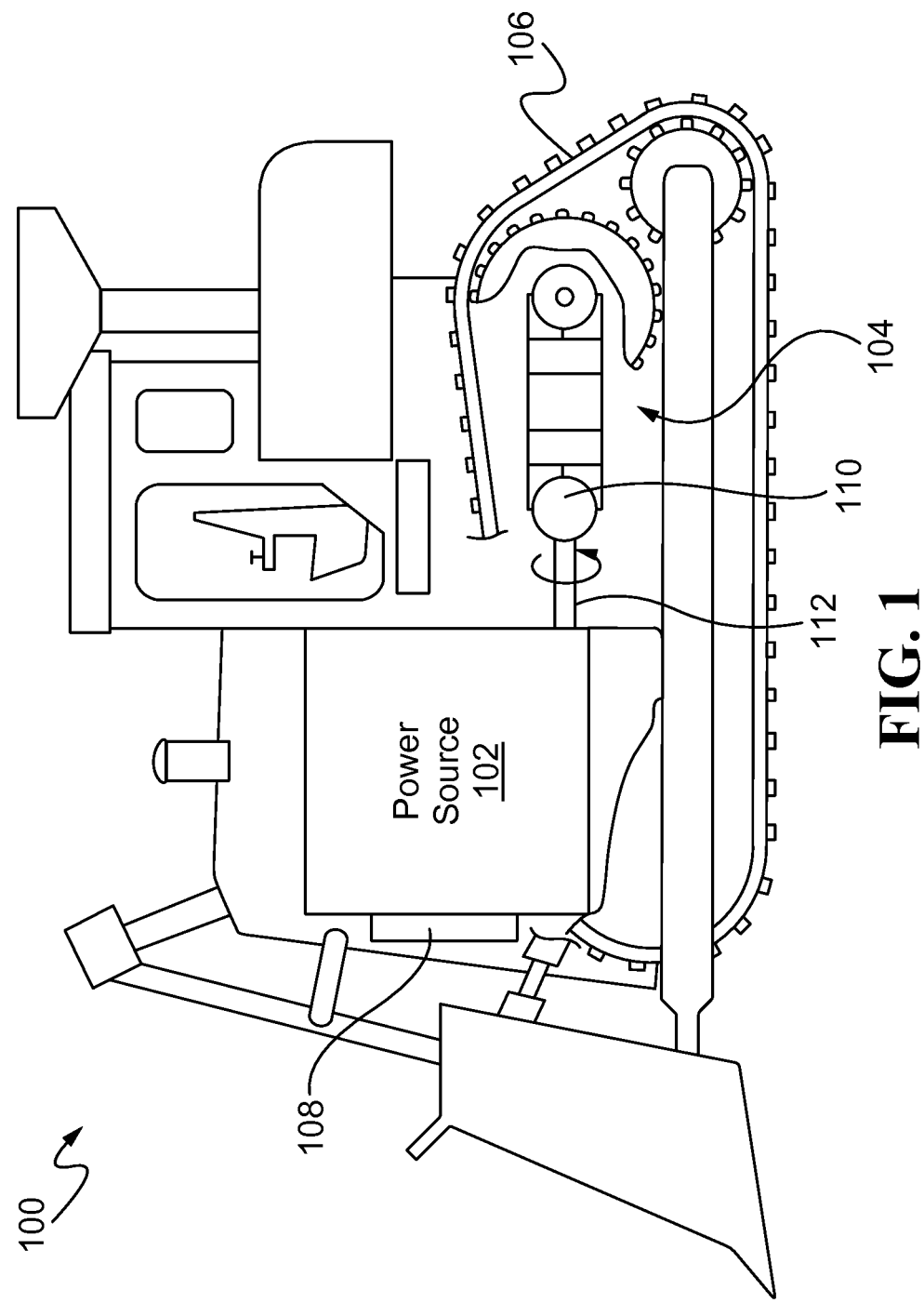
FIG. 1 is a diagrammatic view of one exemplary machine having an electric drive.

FIG. 1 diagrammatically illustrates one exemplary embodiment of a machine 100 that may employ electric drive means to generate electrical energy from mechanical energy or vice versa. In the particular embodiment of FIG. 1, for instance, the machine 100 may include a power source 102 coupled to an electric drive 104 for causing movement via a traction device 106. Moreover, the power source 102 may be configured to mechanically transmit power to an electric machine 110, such as a motor/generator, or the like, of the electric drive 104 via a coupling or axially rotating drive shaft 112. Such mobile machines 100 may be used as a work machine for performing a particular type of operation associated with an industry, such as mining, construction, farming, transportation, or any other suitable industry known in the art. For example, the mobile machine 100 may be an earth moving machine, a marine vessel, an aircraft, a tractor, an off-road truck, an on-highway passenger vehicle, or the like. In general, the power source 102 of the electric drive 104 may include, for example, a combustion engine, such as a diesel engine, a gasoline engine, a natural gas engine, or the like. In alternative applications, the machine 100 may similarly be used in conjunction with other generic types of power sources, such as batteries, fuel cells, and the like. Furthermore, while the machine 100 of FIG. 1 may be illustrated as being mobile, the machine 100 may also be used to generate power in conjunction with stationary applications having, for instance, windmills, hydro-electric dams, or any other suitable means as a power source.

Figure 2:
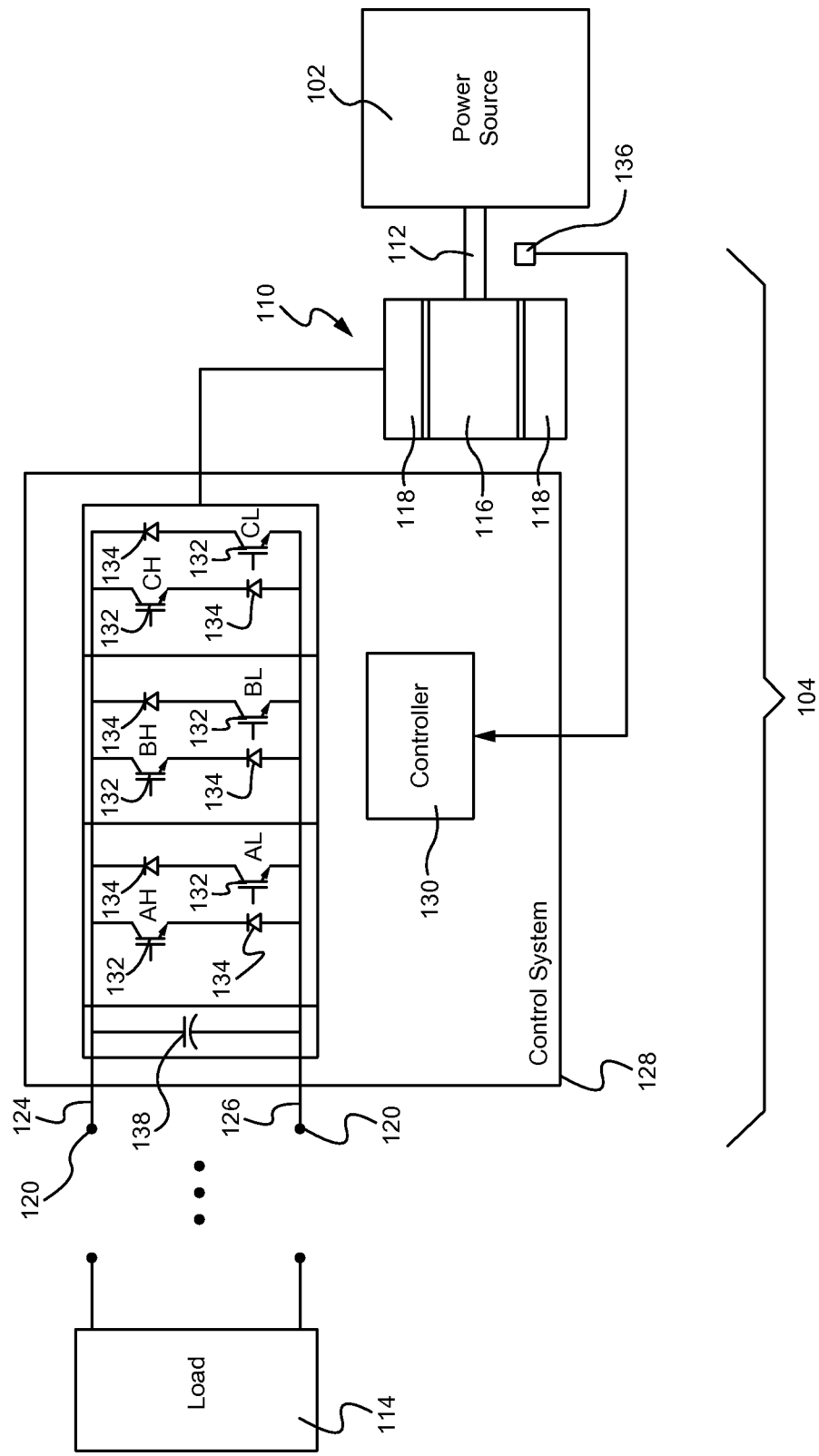
FIG. 2 is a schematic view of one exemplary control system for controlling a switched reluctance (SR) machine constructed in accordance with the teachings of the present disclosure.

FIG. 2 schematically illustrates one exemplary electric drive 104 that may be employed to communicate power between the power source 102 and one or more electrical loads 114. The electric machine 110 of the electric drive 104 in FIG. 2 may be a switched reluctance (SR) machine, or the like, configured to produce electrical power in response to rotational input from the power source 102 and communicate the electrical power to one or more electrical loads 114 of the machine 100. The load 114 may include, for example, motors for causing motion of the machine 100 as well as motors for operating various mechanical tools of the machine 100. As is well known in the art, the SR machine 110 may include a rotor 116 that is rotatably disposed within a fixed stator 118. The rotor 116 may be coupled to an output of the power source 102 via the drive shaft 112, or in other related embodiments, via a direct crankshaft, a gear train, a hydraulic circuit, and the like. The stator 118 may be electrically coupled to a common bus 120 of the electric drive 104 via a converter circuit 122.

During a generating mode of operation, as the rotor 116 is rotated within the stator 118 by the power source 102, electrical current may be induced within the stator 118 and supplied to the converter circuit 122. The converter circuit 122 may in turn convert the electrical signals into an appropriate direct current (DC) voltage for distribution to the various electrical loads 114 of the machine 100. Additionally, the SR machine 110 may be enabled to cause rotation of the rotor 116 in response to electrical signals that are provided to the stator 118 from the common bus 120, for instance, during a motoring mode of operation. The common bus 120 may include a positive line 124 and a negative or ground line 126 across which a common DC bus voltage may be communicated to one or more loads 114 of the machine 100 coupled thereto. For instance, the converter circuit 122 may provide a DC signal to be transmitted through the common bus 120 and to a rectifier circuit where the DC voltage may be converted into the appropriate alternating current (AC) signals for driving the one or more traction motors, or the like, for causing motion of the machine 100 via the traction device 106. The common bus 120 may also communicate the common DC voltage to other loads 114 of the machine 100, such as components of a hybrid system, electrically driven pumps, electrically driven fans, and the like.

Still referring to FIG. 2, the electric drive 104 may also include a control system 128 for controlling the SR machine 110, which may further include a controller 130 that is in communication with at least the converter circuit 122 associated with the electric drive 104. The converter circuit 122 may include a series of transistors or gated switches 132, such as insulated-gate bipolar transistors, and diodes 134 for selectively enabling or chopping current sourced to one or more phase windings of the SR machine 110. A three-phase SR machine 110, for example, may be driven using a converter circuit 122 having six switches 132 and six diodes 134 for selectively chopping current through the three phase legs of the SR machine 110. Each of the switches 132 may be enabled or disabled via gate signals, which may be supplied by the controller 130. In particular modifications, the control system 128 may also be provided with encoders or sensors 136, such as rotor position sensors, rotor speed sensors, or the like, adapted to generate sensor signals corresponding to the rotational speed and/or position of the rotor 116 relative to the stator 118 and communicate the sensor signals to an input of the controller 130. The sensors 136 may include a variable reluctance sensor, a capacitance sensor, a Hall-effect sensor, an anisotropic magnetoresistance sensor, or the like. The sensors 136 may also include means for measuring any one or more of the bus voltage, the phase current through the phases of the stator 118, and the like. In further alternative modifications, any one or more of the rotor speed, the rotor position, the bus voltage and the phase current may be estimated or derived through sensor-less means by the controller 130 rather than measured. Power to the control system 128 and the converter circuit 122 may be provided by an external or a secondary power source, such as provided by a battery (not shown), residual voltage stored in a capacitor 138 of the common bus 120, or any other suitable current-limited DC power supply.

The controller 130 of FIG. 2 may be implemented using one or more of a processor, a microprocessor, a microcontroller, an electronic control module (ECM), an electronic control unit (ECU), or any other suitable means for providing electronic control to the electric drive system 104. More specifically, the controller 130 may be configured to operate the SR machine 110 of the electric drive 104 according to predetermined algorithms or sets of instructions designed to optimize the performance of the machine 100 based on one or more observed characteristics of the SR machine 110, the engine 102, the electric drive 104, and the like. The controller 130 may observe, for example, the rotor speed, the rotor position, the load on the electric drive system 104 and/or SR machine 110, the phase current through each phase of the stator 118, and the like. Among other things, the controller 130 may compare one or more of the observed parameters to predefined thresholds in order to determine the immediate rotor speed of the SR machine 110, and further, to determine if the rotor speed corresponds to a relatively high speed, a mid-range/nominal speed or a relatively low speed.

Such rotor speeds may be classified with respect to a base speed that is specific to the given SR machine 110 and/or the load associated therewith. Furthermore, the base speed may generally be defined as the maximum speed at which the SR machine 110 is able to output generally constant torque before torque output begins to decrease proportionally with rotor speed. As an example, relatively high speeds may be classified as rotor speeds approximately exceeding the base speed, while relatively low speeds may be classified as rotor speeds approximately ranging between zero and base speeds. Nominal speeds may correspond to rotor speeds which approximate the base speed. Such algorithms may additionally or alternatively include predefined control maps or lookup tables which may suggest to the controller 130 a predefined control scheme that best corresponds to a given situation and optimizes performance. Algorithms or sets of instructions and conditionals may be preprogrammed or incorporated into a memory of the controller 130 by means commonly known in the art.

During propulsion or an otherwise motoring mode of operation, the controller 130 may adjust the manner in which current is supplied to each phase leg of the stator 118 according to the observed rotor speed so as to optimize machine performance and efficiency. For example, if the rotor speed is determined to be relatively high, the controller 130 may adopt a single pulse mode of operation in which both switches 132 associated with each phase leg of the stator 118 are closed so as to operate the SR machine 110 in a substantially constant power range of output. Alternatively, if the rotor speed corresponds to nominal or relatively low speeds, the controller 130 may regulate the phase current using, for instance, either a hard chopping control scheme or a soft chopping control scheme. Although other designations may exist, hard chopping schemes may generally be more adapted for use within regions of machine operation where current regulation is desired but controllability poses an issue. Such regions may include retarding regions of operation or regions in which current tracking is more critical. In a hard chopping scheme, the controller 130 may simultaneously open and close both switches 132 of each phase leg at the required frequency so as to maintain a substantially constant torque range of output. In a soft chopping scheme for a motoring mode of operation, the controller 130 may continuously close one of the two switches 132 while opening and closing the remaining switch 132 of each phase leg to maintain a substantially constant torque output.

Figure 3:
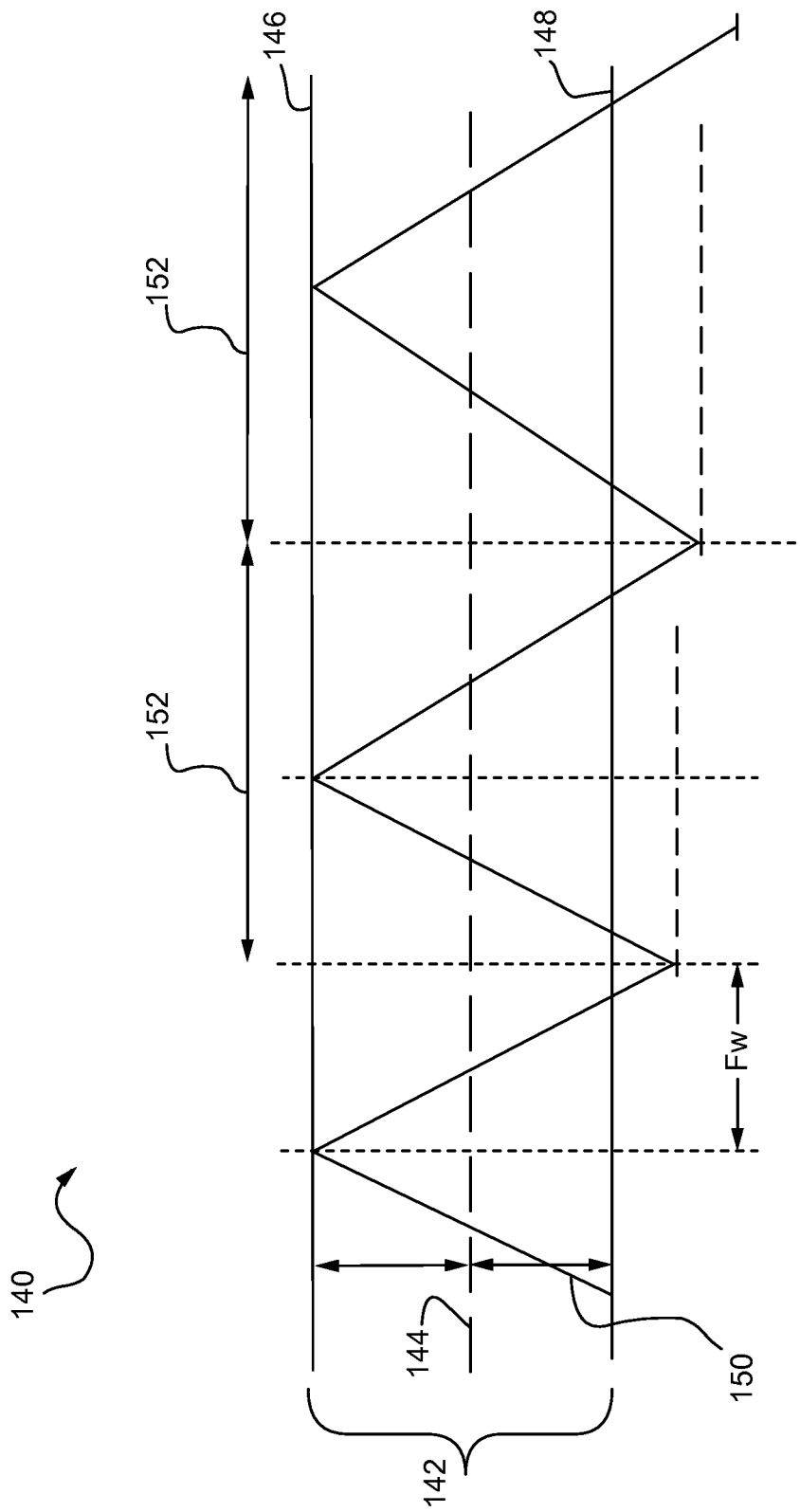
FIG. 3 is a graphical view of one application of controlling current chopping for one phase of an SR machine using a non-compensating hysteresis-based scheme.

One or more of the hard chopping and soft chopping control schemes may be managed at least in part by a hysteresis control scheme 140, one application of which is generally illustrated by example in FIG. 3. As shown, the hysteresis control scheme 140 may establish a hysteresis band 142 that is substantially centered about a desired or target phase current 144 for each phase of the stator 118. Specifically, the hysteresis band 142 may include an upper current threshold 146 disposed above the target current 144 and a lower current threshold 148 disposed below the target current 144, where each of the upper and lower current thresholds 146, 148 may be substantially equidistant from the target current 144. The upper current threshold 146 may be indicative of when both of the switches 132 for one phase of the stator 118 are switched off or disabled. In FIG. 3 for instance, the downward slope of the phase current 150 may correspond to when the both switches 132 of the converter circuit 122 are turned off. The lower current threshold 148 may be indicative of when both switches 132 of the phase should be switched back on or closed. The phase current 150 may increase while both switches 132 are closed as illustrated by the upward slope of the phase current 150 in FIG. 3. Moreover, the upper and lower current thresholds 146, 148 may indicate the points at which the switches 132 should be engaged in order to maintain an average phase current that is substantially consistent with the target current 144 and provide more consistent and accurate average torque output. In still other alternative embodiments, the upper current threshold 146 may also be indicative of when freewheeling should occur, or when one of the two switches 132 should be switched off or opened, while the lower current threshold 148 may be indicative of when freewheeling should cease.

However, as shown in FIG. 3 for instance, the hysteresis control scheme 140 must abide by a given switching frequency or switching period 152, and in doing so, the corresponding switch 132 of each phase may not always be able to timely engage with respect to the lower current threshold 148.

If the switches 132 are only enabled to switch according to the switching frequency, for example, the phase current 150 may continue to freewheel past or below the lower current threshold 148 as demonstrated in FIG. 3. When this occurs, subsequent lower current thresholds 148 may progressively drop to lower indices, thus also causing the overall average phase current in subsequent switching periods 152 to decrease and depart from the desired current target 144. Furthermore, as the average current decreases, the corresponding average torque output, and thus, the accuracy of torque production of the SR machine 110 may effectively decrease. Although the switching frequency may be modified to accommodate for the gradual decrease in current, increasing the switching frequency may cause significant losses as well as other complications when driving the SR machine 110 during such low speed, high power operations.

Figure 4:
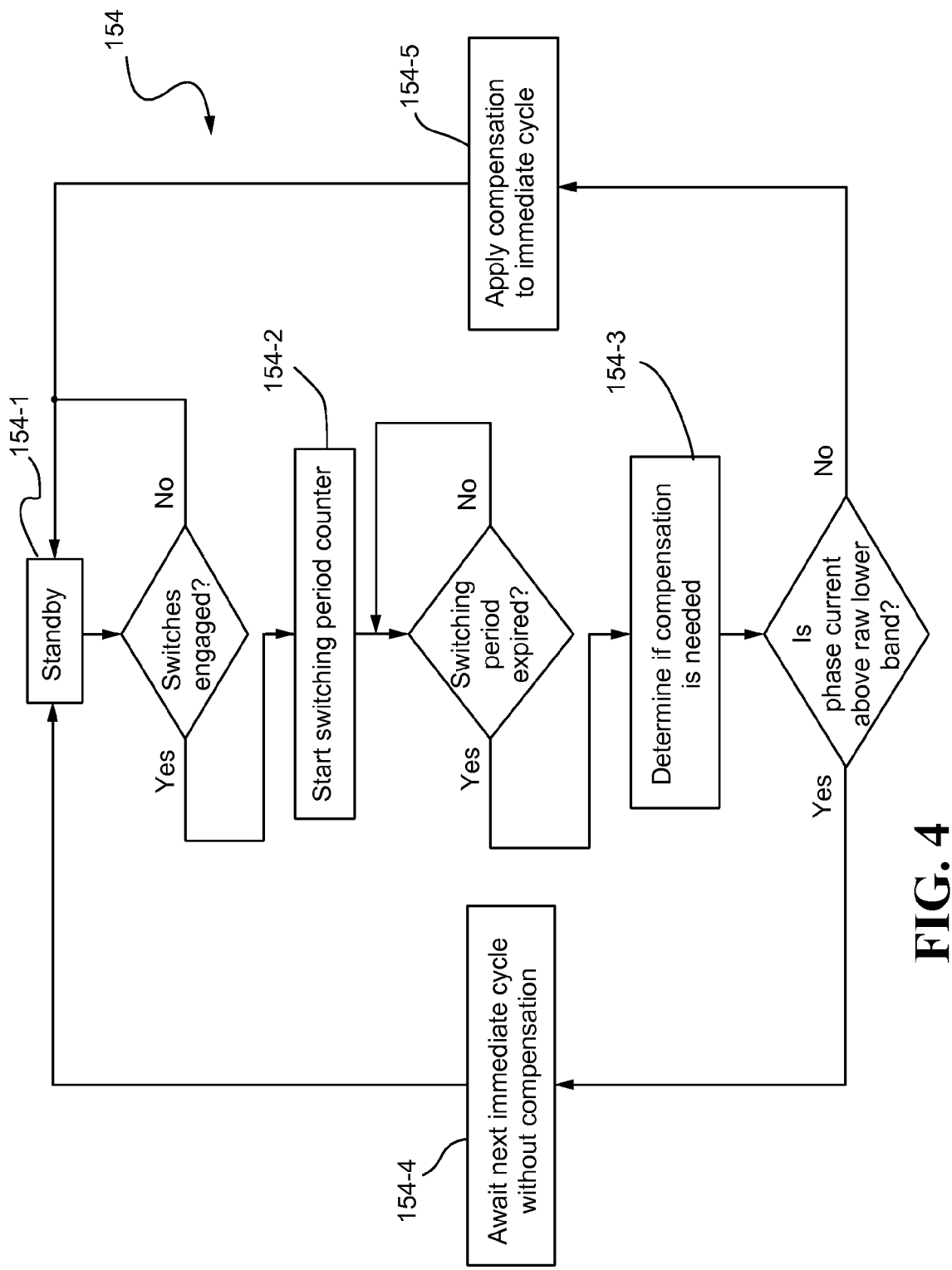
FIG. 4 is a diagrammatic view of one exemplary method of determining applicability of hysteresis compensation.

Thus, in order to maintain the average phase current through each phase of the stator 118 at a desired target current without increasing switching frequency, the controller 130 may be configured or preprogrammed to dynamically compensate the hysteresis band as needed per switching period and per phase of the stator 118 according to the algorithm or method 154 shown in FIG. 4 for example. Specifically, the method 154 shown may be applied for all or specific operational speed ranges of the SR machine 118 and relevant to one or more different types of available chopping modes of operation. Additionally, the method 154 may be independently applied to each individual phase of the stator 118, and further, independently applied for each successive switching period of the SR machine 110. Although the method 154 shown may be implemented for use with an SR machine 110, it will be understood that the configurations, systems, schemes, techniques and methods for compensating hysteresis band limits disclosed herein may be similarly applied to any other suitable hysteresis-based control means.

Figure 5:
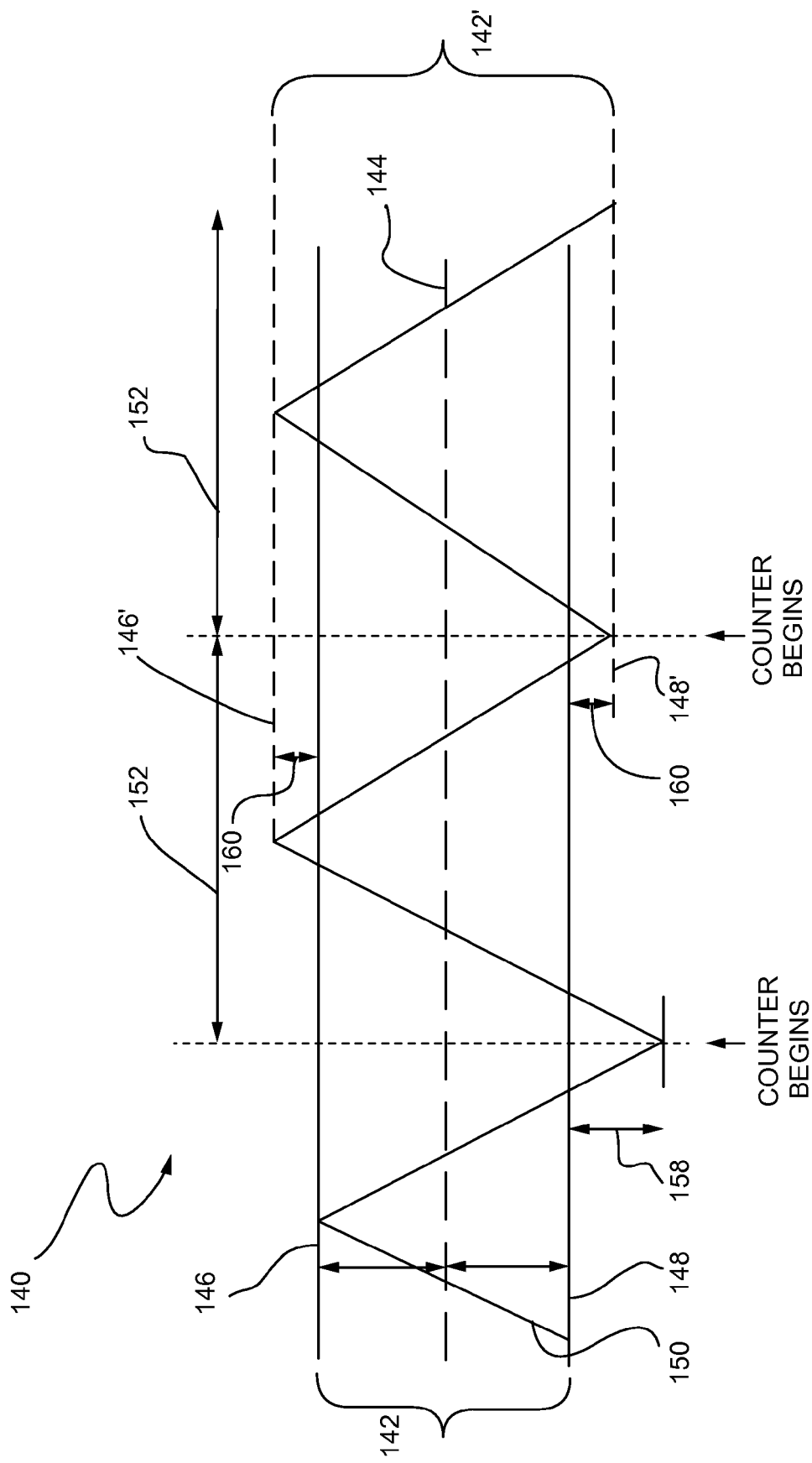
FIG. 5 is a graphical view of one application of controlling current chopping for one phase of an SR machine using hysteresis compensation.

With reference to one implementation for use with an SR machine 110, the algorithm or method 154 may initially configure the controller 130 to standby and determine when the switches 132 are first engaged, as shown in step 154-1 of FIG. 4. If no relevant switching event is detected, the controller 130 may continue to monitor the activity of the switches 132 in the standby step 154-1. However, if a relevant switching event is observed, the controller 130 may proceed to initiate a switching period counter in step 154-2. The controller 130 may be configured to begin the period counter when both switches 132 of a phase of the stator 118 are turned on or closed, or as indicated in FIG. 5, for example, the point at which the observed phase current 150 is at its lowest point. Moreover, the switching period 152 may be defined to extend between each successive turn on point, or when both switches 132 of a phase are enabled or closed. The period counter may continue counting for a predefined duration of time, at which point the controller 130 may be configured to proceed to step 154-3 in order to determine whether any compensation of the hysteresis band 142 is needed.

In step 154-3, the controller 130 may be configured to determine the actual phase current 150, for instance, as measured at the point of expiration of the period counter. The controller 130 may additionally compare the measured phase current 150 to the raw limits of the hysteresis band 142, or the predefined upper and lower current thresholds 146, 148 to determine if the phase current 150 is within the desired hysteresis band 142. If the phase current 150 is found to be within acceptable limits, the controller 130 may proceed to step 154-4 and leave the hysteresis band 142 as is without applying any compensation thereto. The controller 130 may then return to step 154-1 and standby for the next switching event.

Alternatively, if the phase current 150 is determined to fall below the lower current threshold 148 and/or lie outside of the raw limits of the hysteresis band 142, the controller 130 may be configured to proceed to step 154-5. During step 154-5, the controller 130 may be able to apply the appropriate compensation to the hysteresis band 142 for the immediate cycle or switching period 152 prior to returning to the standby step 154-1 and prior to proceeding to the next switching event.

Figure 6:
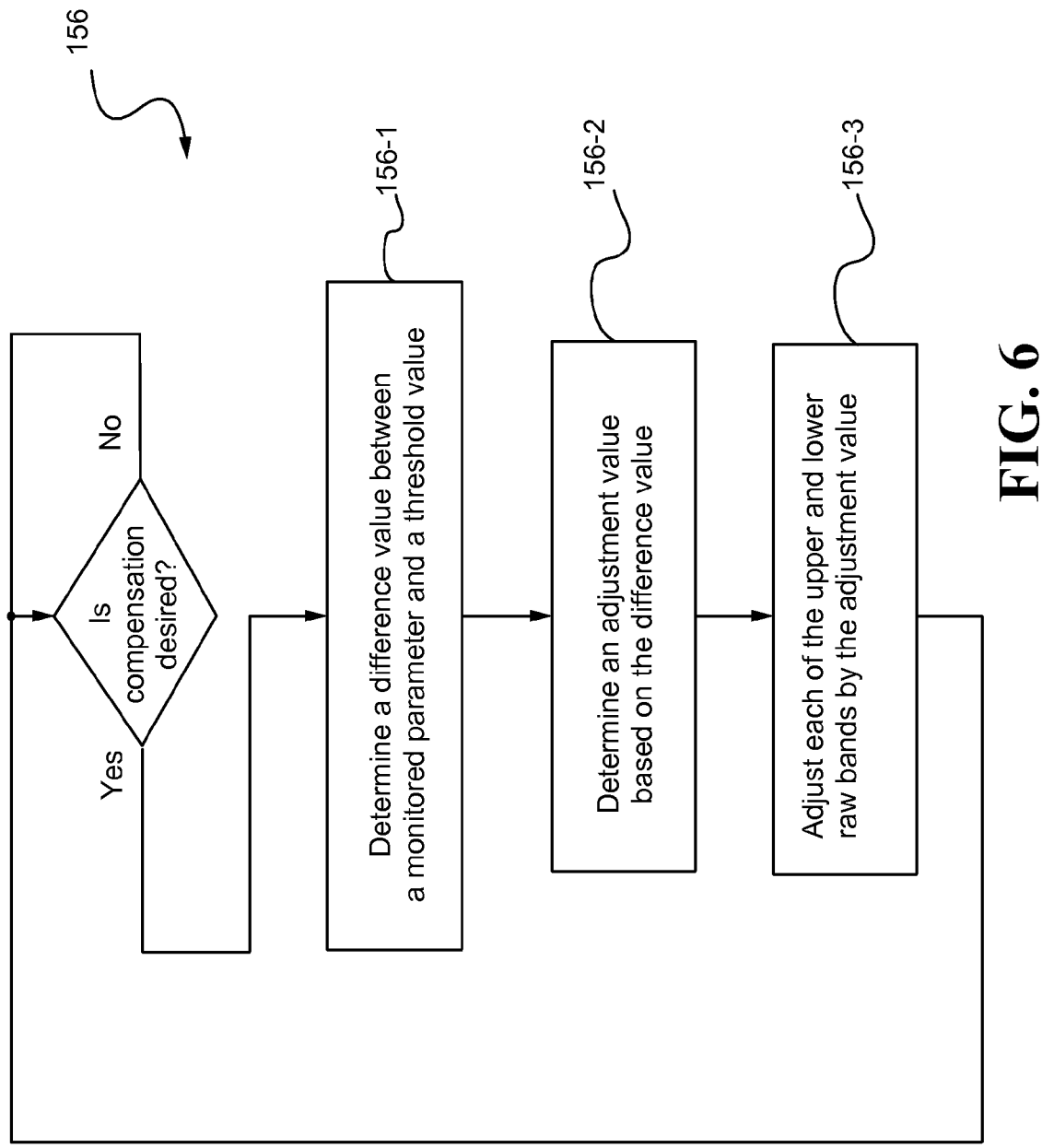
FIG. 6 is a diagrammatic view of one exemplary method of compensating a hysteresis band during current chopping control.

When compensation of the hysteresis band 142 is desired, the compensation step 154-5 of the algorithm 154 of FIG. 4 may be implemented in accordance with a subroutine or method 156, as shown for example in FIG. 6. Specifically, the controller 130 may be configured or preprogrammed to proceed to step 156-1 to first determine the degree to which the measured phase current 150 departs from the raw lower limit or the lower current threshold 148 of the hysteresis band 142. As illustrated in FIG. 6, for example, the controller 130 may be configured to determine a difference value 158, or a quantified difference between the lower current threshold 148 and the phase current 150 as measured at the expiration of the period counter. Once the difference value 158 is obtained, the controller 130 may further proceed to step 156-2 to determine an adjustment value 160 based at least partially on the difference value 158 determined in step 156-1. In one particular embodiment, for instance, the controller 130 during step 156-2 may be configured to calculate approximately half of the difference value 158 determined in step 156-1, and define the adjustment value 160 as the half-value.

Upon determining the adjustment value 160 in step 156-2, the controller 130 during step 156-3 may then apply the adjustment value 160 to the hysteresis band 142 and immediately restart the period counter. Specifically, the controller 130 may apply the adjustment value 160, or half of the difference value 158, substantially equally to each of the upper and lower current thresholds 146, 148 of the hysteresis band 142. As shown in FIG. 5 for example, the controller 130 may increase the upper current threshold 146 by the adjustment value 160, and decrease the lower current threshold 148 by the adjustment value 160, so as to broaden the hysteresis band 142 without altering the effective target current 144. More particularly, the hysteresis band 142 may be compensated but maintained substantially centered about the target current 144 such that the resulting average phase current does not droop with each successive cycle as observed in the prior art.

Each iteration of the hysteresis compensation subroutine 156 of FIG. 6 may be performed and completed prior to advancing to the next immediate cycle or switching period 152 so as to provide for a more consistent phase current 150, and thus, more consistent torque production, throughout operation of the SR machine 110. Furthermore, each iteration of the hysteresis compensation subroutine 156 may be performed independently for each successive switching period 152 such that the phase current 150 is compared only with the originally defined raw limits 146, 148 of the hysteresis band 142 and not with the limits 146', 148' modified by previous compensations. If the phase current 150 in FIG. 5 falls below the raw, lower current threshold 148 in the next immediate switching period 152, another iteration of the subroutine or method 156 of FIG. 6 may be performed to compensate the raw upper and lower current thresholds 146, 148 and not to modify the limits 146', 148' from the previous switching period 152.

The controller 130 may so operate according to the methods 154, 156 of FIGS. 4 and 6 until the controller 130 and the SR machine 110 exits the associated mode of operation, for instance, a hard chopping or a soft chopping mode of operation. Although the embodiments of the present disclosure are shown to compensate hysteresis bands 142 in response to phase currents 150 which fall below the lower current thresholds 148 thereof, it will be understood that the teachings of the present disclosure may similarly be employed to compensate hysteresis bands 142 in response to phase currents 150 which exceed the upper current thresholds 146 thereof. In addition, each iteration of the hysteresis compensation method 156 may be applied independently for each individual phase of the stator 118 of the SR machine 110. Still further, the general subroutine or method 156 outlined by FIG. 6 may be similarly applied to any other suitable hysteresis-based control scheme and is not limited for use with SR machines 110.

Industrial Applicability

In general, the foregoing disclosure finds utility in generally any hysteresis-based scheme for controlling and/or limiting one or more parameters, signals, transmissions, outputs, and the like, within a desired range. The foregoing disclosure more particularly finds utility in various industrial applications, such as the farming, construction and mining industries in providing smoother and more efficient control of machines typically used in association with work vehicles and/or machines, such as tractors, backhoe loaders, compactors, feller bunchers, forest machines, industrial loaders, skid steer loaders, wheel loaders, and the like. The present disclosure also finds utility in various applications with stationary machines, such as windmills, hydro-electric dams, and the like.

Moreover, the disclosed control systems and methods may be applied to essentially any hysteresis-based control system where compensation of hysteresis limits is applicable, for example, for use with electric drive systems and machines having switched reluctance (SR) or other comparable machines commonly used in the art. More specifically, the systems and methods disclosed herein assist controls for current chopping schemes used in SR machines which, among other things, help maintain an average phase current that is more consistent with a target phase current so as to provide more consistent average torque output and improve overall torque accuracy. Furthermore, the present disclosure enables hysteresis-based compensations which provide more consistent torque output while satisfying the switching frequency of the associated machine and without increasing risks associated with over-current conditions.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A control system for compensating a hysteresis band of a switched reluctance (SR) machine having a rotor and a stator, the control system comprising:
a converter circuit operatively coupled to the stator and including a plurality of switches in selective communication with each phase of the stator; and
a controller in communication with each of the stator and the converter circuit, the controller being configured to monitor at least one phase current of the SR machine relative to each of an upper current threshold and a lower current threshold of the hysteresis band, determine an adjustment value based on a difference between the phase current and an exceeded one of the upper and lower current thresholds if the phase current exceeds either current threshold, and compensate the current thresholds by the adjustment value.

2. The control system of claim 1, wherein the controller is configured to define the adjustment value as approximately half of the difference between the phase current and the exceeded current threshold.

3. The control system of claim 1, wherein the controller is configured to substantially equally apply the adjustment value to each of the upper and lower current thresholds.

4. The control system of claim 1, wherein the controller is further configured to monitor a state of the switches associated with each phase of the stator, and start a predefined and finite switching period counter based on an observed change in the state of the switches.

5. The control system of claim 1, wherein the controller is configured to compensate the hysteresis band of each successive switching period independently.

6. The control system of claim 3, wherein the controller increases the upper current threshold by the adjustment value, and decreases the lower current threshold by the adjustment value.

7. The control system of claim 4, wherein the controller is configured to start the switching period counter when the switches associated with each phase of the stator turn on.

8. The control system of claim 7, wherein the controller is configured to determine the adjustment value based on a difference between the exceeded current threshold and the phase current as measured at an expiration of the switching period counter.

9. A method of controlling hysteresis compensation, the method comprising the steps of:
monitoring at least one parameter relative to each of an upper threshold and a lower threshold of a hysteresis band;
determining an adjustment value based on a difference between the at least one parameter and any exceeded one of the upper and lower thresholds; and
adjusting each of the upper and lower thresholds of the hysteresis band by the adjustment value.

10. The method of claim 9, wherein the adjustment value is defined as approximately half of the difference between the at least one parameter and the exceeded one of the upper and lower thresholds.

11. The method of claim 9, wherein the adjustment value is equally applied to each of the upper and lower thresholds, the upper threshold being increased by the adjustment value and the lower threshold being decreased by the adjustment value.

12. The method of claim 11, wherein the at least one parameter comprises a phase current through at least one phase of a stator of a switched reluctance (SR) machine being controlled by switches associated therewith, and the upper and lower thresholds correspond to current thresholds.

13. The method of claim 12, wherein the adjustment value is determined upon expiration of a predefined switching period counter, the switching period counter corresponding to a duration of time all of the switches associated with a particular phase of the stator are turned on.

14. The method of claim 13, wherein the need for hysteresis compensation is derived individually for each phase of the stator, and any determined adjustment value is independently derived for each successive switching period.

15. A method of providing hysteresis compensation for a switched reluctance (SR) machine having a rotor and a stator, the method comprising the steps of:
monitoring a phase current through at least one phase of the stator relative to each of an upper current threshold and a lower current threshold of a hysteresis band;

determining a difference value between the phase current and any one of the upper and lower current thresholds exceeded by the phase current;

determining an adjustment value based at least partially on the difference value; and adjusting each of the upper and lower current thresholds of the hysteresis band by the adjustment value.

16. The method of claim 15, wherein the adjustment value is approximately half of the difference value.

17. The method of claim 15, wherein the upper current threshold is increased by the adjustment value, and the lower current threshold is decreased by the adjustment value.

18. The method of claim 15, wherein the step of monitoring is performed upon expiration of a predefined switching period counter.

19. The method of claim 18, wherein a duration of the switching period counter corresponds to a duration of time all switches associated with a particular phase of the stator is turned on.

20. The method of claim 15, wherein the adjustment value is independently derived for each successive switching period.

\* \* \* \* \*

UNITED STATES PATENT AND TRADEMARK OFFICE
CERTIFICATE OF CORRECTION

| | | |
|---|---|---|
| PATENT NO. | : 8,975,855 B2 | Page 1 of 1 |
| APPLICATION NO. | : 13/555530 | |
| DATED | : March 10, 2015 | |
| INVENTOR(S) | : Gerdes et al. | |

It is certified that error appears in the above-identified patent and that said Letters Patent is hereby corrected as shown below:

IN THE SPECIFICATION

Column 9, line 13, delete "Industrial Applicability" and insert -- INDUSTRIAL APPLICABILITY --.

Signed and Sealed this
Second Day of February, 2016

Michelle K. Lee
*Director of the United States Patent and Trademark Office*